United States Patent
Loewenstein et al.

(10) Patent No.: US 7,021,585 B2
(45) Date of Patent: Apr. 4, 2006

(54) AIRCRAFT ENGINE REAR MOUNT WITH THRUST LINKS AND BOOMERANG-SHAPED LEVER

(75) Inventors: Philippe Loewenstein, Saint Arnoult le Bourg (FR); Frédéric Darcy, Vaux le Penil (FR); Marc Tesniere, Champcueil (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/874,349

(22) Filed: Jun. 24, 2004

(65) Prior Publication Data

US 2005/0067528 A1    Mar. 31, 2005

(30) Foreign Application Priority Data

Jun. 30, 2003    (FR) .................................... 03 07893

(51) Int. Cl.
*B64D 27/00* (2006.01)

(52) U.S. Cl. ..................... 244/54; 248/554; 60/796; 60/797

(58) Field of Classification Search .............. 244/53 R, 244/54, 55, 58, 60, 131; 248/554; 60/796, 60/797

See application file for complete search history.

(56) References Cited

U.S. PATENT DOCUMENTS

| | | | | |
|---|---|---|---|---|
| 5,320,307 | A | * | 6/1994 | Spofford et al. ............... 244/54 |
| 5,725,181 | A | * | 3/1998 | Hey ............................. 244/54 |
| 6,059,227 | A | * | 5/2000 | Le Blaye et al. ............. 244/54 |
| 6,494,403 | B1 | * | 12/2002 | Jule et al. ..................... 244/54 |
| 6,758,438 | B1 | * | 7/2004 | Brefort et al. ................. 244/54 |

FOREIGN PATENT DOCUMENTS

| | | | |
|---|---|---|---|
| EP | 0 564 126 B1 | 10/1993 | |
| EP | 0 879 759 B1 | 11/1998 | |
| EP | 1 136 355 A1 | 9/2001 | |
| FR | 2 830 515 | * 10/2001 | ................... 244/54 |

* cited by examiner

*Primary Examiner*—Michael Carone
*Assistant Examiner*—John Amir Radi
(74) *Attorney, Agent, or Firm*—Oblon, Spivak, McClelland, Maier & Neustadt, P.C.

(57) ABSTRACT

A turbine engine mount to a pylon of an aircraft includes a bracket arranged to be attached to the pylon, and a lever attached in its central part to the bracket via a first connection and two thrust links each joined aft to the lever by a second connection. The lever includes a central part with two arms, and the bracket includes an integral attachment lug placed between the two arms and connected to the arms via a pivot pin to form the first connection. The lever is laterally connected to the bracket via pivot pins passing through the lever and mounted with a clearance to form connections on standby.

13 Claims, 3 Drawing Sheets

AIRCRAFT ENGINE REAR MOUNT WITH THRUST LINKS AND BOOMERANG-SHAPED LEVER

Figure 1:
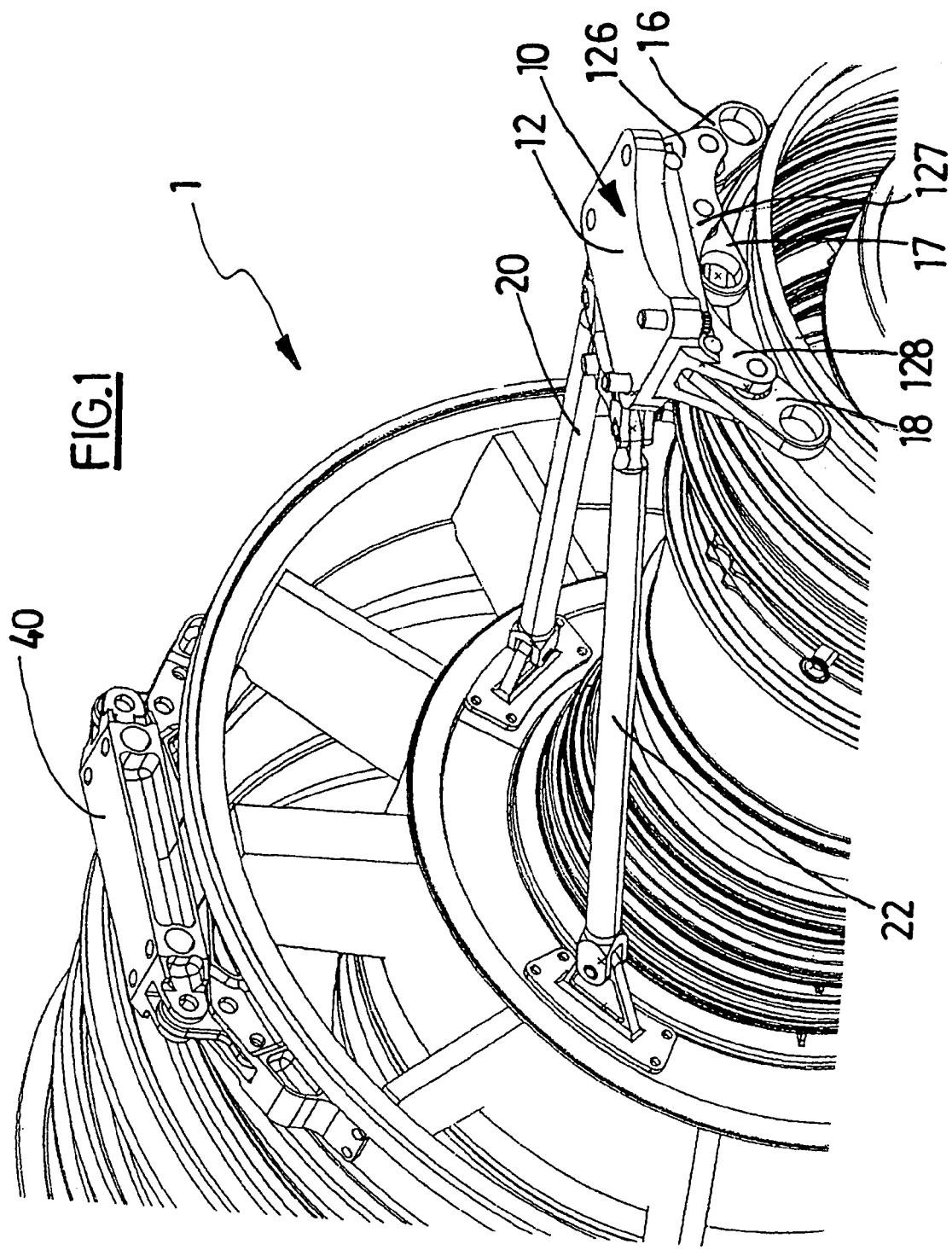

The present invention pertains to the mounting of gas turbine engines to an aircraft structure. In particular it concerns a rear mounting with thrust mount comprising means to maintain the functioning of the rear mounting in the event of failure of one of its parts.

A gas turbine engine may be mounted at various points of an aircraft, being attached to a pylon belonging to the aircraft structure. It may be suspended below the wings, attached to the fuselage or mounted in the tail section by mounting means. The function of these mounting means is to ensure the transmission of mechanical stresses between the engine and the aircraft structure. The loads to be taken into consideration are oriented along three main directions. They are especially the weight of the engine, its thrust and aerodynamic side loads. The loads to be transmitted also include rotary torque about the engine axis. In addition these means must absorb the deformations to which the engine is subjected during the different flight phases in particular on account of dimensional variations due to thermal expansion and retraction.

One mounting mode for example for a turbofan gas turbine engine consists of mounting the engine on a pylon belonging to the wing structure of the aircraft by a forward mount or attachment and an aft mount or attachment. The forward mount is attached in particular to the outer fan frame and the rear mount to the primary exhaust stream case.

According to one known configuration, the forward mount is arranged to ensure the transmission of vertical and lateral mechanical stresses between the engine and the aircraft. The aft mount is arranged to ensure the transmission of mechanical stresses along these same directions as well as engine torque about the turbine engine axis and thrust. The latter is transmitted via two thrust links attached forwardly to the base of the fan frame either side of the longitudinal axis, and at the rear to the aft engine mount.

The present invention concerns the rear mount with thrust transmitting means.

As is known, said mount includes more precisely a bracket that is attached to a structural part of the aircraft, called pylon, the two thrust links joined to the bracket by a lever, and a set of articulated links on the primary exhaust stream frame. To overcome the problems arising in the event of failure of a component part, such as one of the links or the lever, ensuring transmission of thrust loads between the engine and the aircraft structure, the mount is always provided with failsafe means intended to substitute for the faulty part.

Patent application EP 1136355 describes a thrust mount device with means connecting together, with clearance, each of the thrust links and the bracket. These means ensure the transmission of thrust loads in the event of failure of one of parts of the device. Forwardly the bracket comprises a central clevis on which the lever is articulated. The two thrust links are articulated via first pivot axes at the two ends of the lever. As safety means the bracket comprises two additional side lugs either side of the central clevis. These lugs receive the connection means with clearance of each of the thrust links. The connections with clearance each consist of a pivot axis, parallel to the first axis, passing through both the side lug and the clevis of the corresponding thrust link. The pivot pin is mounted with clearance on the attachment lug of the bracket. During normal operation, loads are transmitted by the thrust links, the lever, the central clevis of the bracket and the bracket itself. In the event of failure of one of the thrust links for example, a relative offset occurs leading to absorption of the clearance of the other thrust link. The connection becomes rigid and ensures the transmission of loads.

This device fully meets the safety function it is intended to carry out.

Other arrangements have been put forward to ensure the transmission of loads in the event of accidental failure of one of the constituent parts of the thrust mount device.

Patents EP 564126, EP 879759 or EP 805108 also describe such devices using a lever connecting the two thrust links to the rear bracket via a central articulation. Said articulation comprises a pivot axis oriented radial fashion relative to the longitudinal axis of the engine. The pivot pin crosses through the lever and a double central clevis integral with the bracket. These patents describe various means for ensuring thrust transmission in the event of abnormal functioning.

The applicant has set out to improve the devices of the prior art both from a mechanical viewpoint and from the viewpoint of manufacturing costs.

According to the invention, the turbine engine mounting on the pylon of an aircraft comprising a bracket designed to be attached to the pylon, a lever whose central part is attached to the bracket by first connection means with pivot axis and two thrust links each joined aft to the lever by second connection means and forwardly comprising means for attachment to the engine, is characterized in that the first connection means consist of two parallel arms spaced apart on the central part of the lever, cooperating with an attachment lug integral with the bracket via a pivot pin and the lever comprises two third side connection means, on standby, with the bracket.

The invention has the advantage of improving safety in the event of failure of a part by doubling the loadpaths on the lever between the thrust links and the bracket. Should a crack occur on one of the arms of the central part of the lever, loads are transmitted by the other arm.

According to a first embodiment, the lever comprises, either side of its central part, a side attachment lug to support the second and third connection means.

According to a second embodiments, the lever comprises, either side of its central part, a clevis to support the second and third connection means.

This latter solution offers the particular advantage of enabling the machining, on the front face of the bracket, of a single monoplanar part forming the attachment lugs for the first and third connection means between the lever and the bracket. The contour of the bracket is hence simpler making its machining easier and more economical. Stress concentrations are also reduced.

Figure 2:
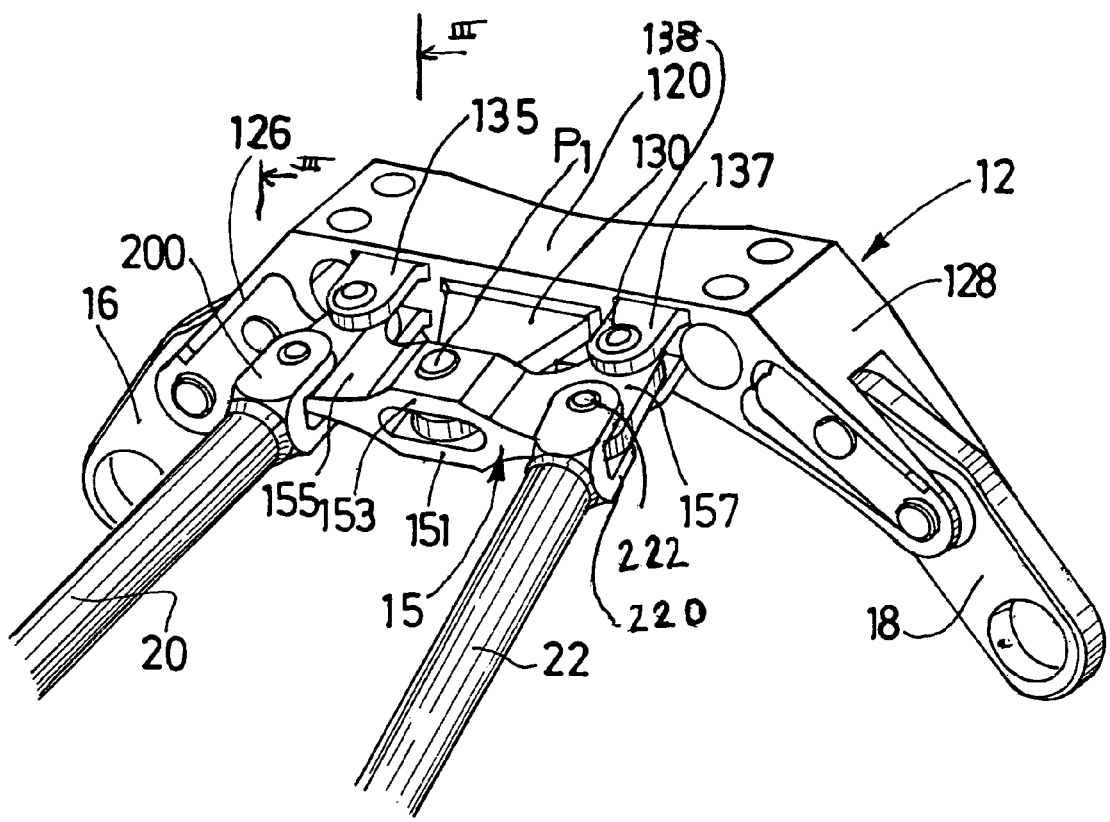
Figure 3:
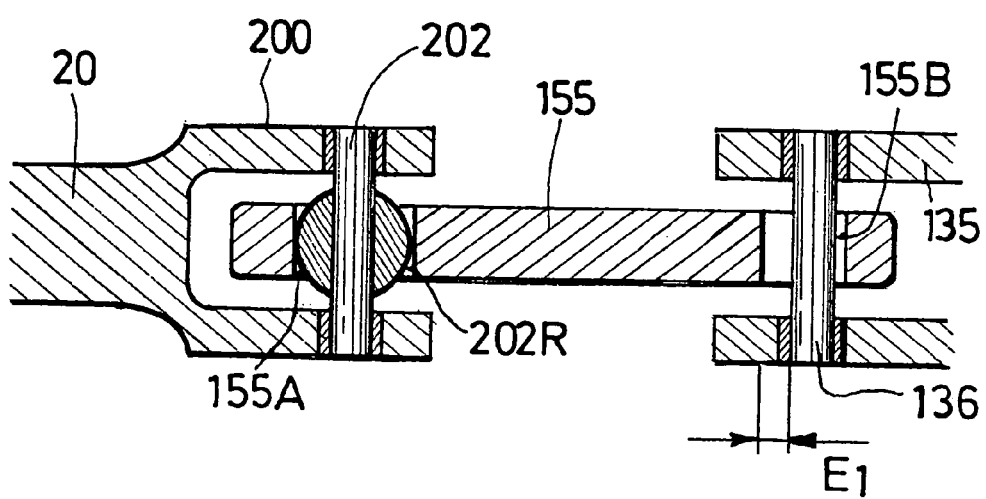
Figure 4:
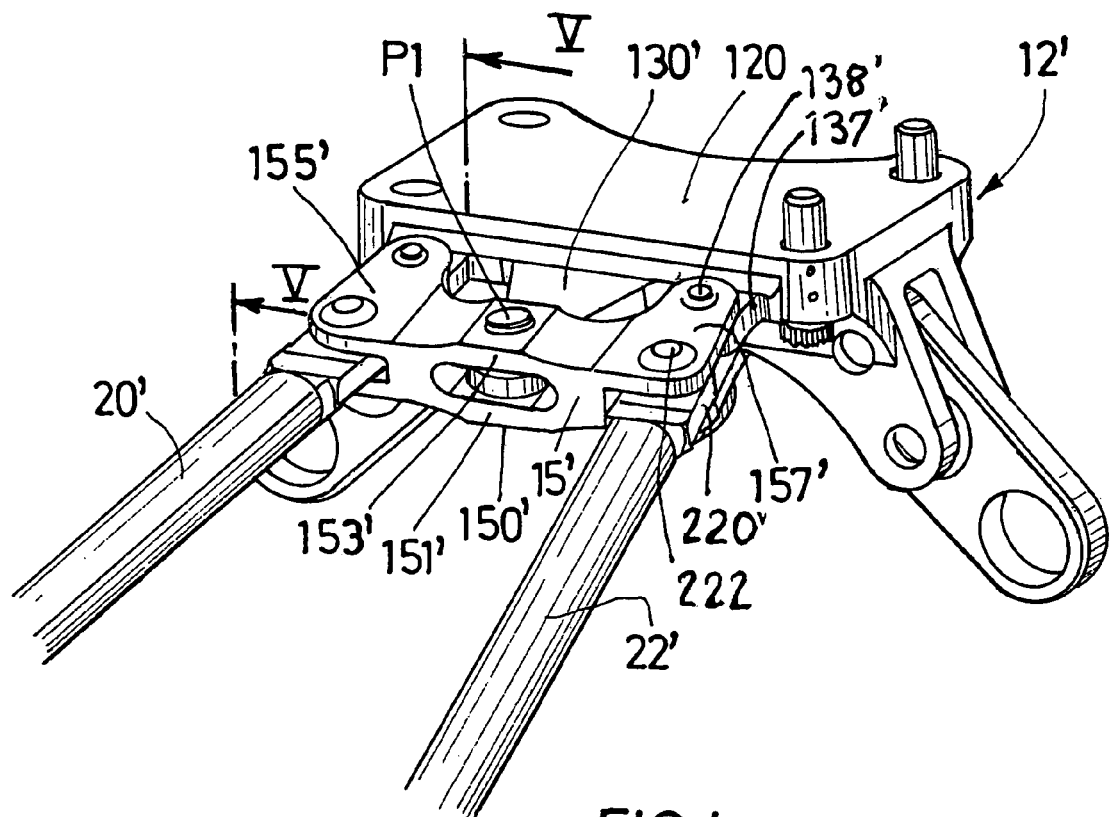
Figure 5:
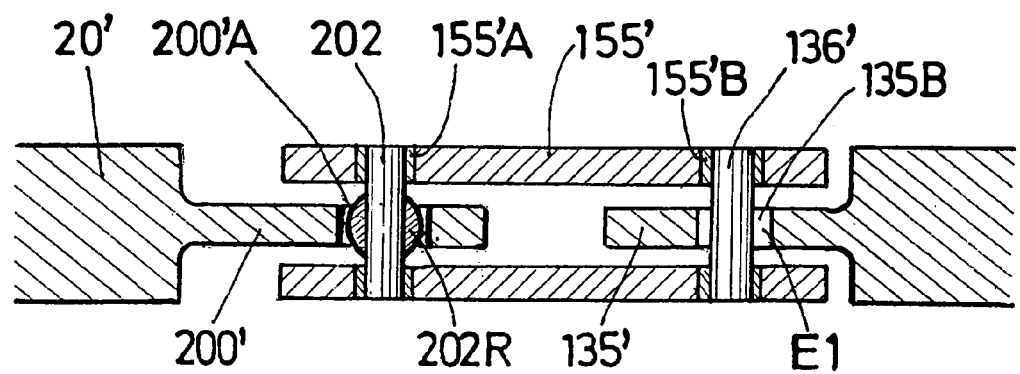

Other characteristics and advantages will become apparent on reading the following description accompanied by the appended drawings in which:

FIG. 1 shows a general view of the mounting of an engine to the pylon of an aircraft wing, FIG. 2 shows the rear mount of the invention according to a first embodiment, FIG. 3 is a cross-section view along direction III—III in FIG. 2, FIG. 4 shows the rear mount of the invention according to a second embodiment, FIG. 5 is a cross-section view along direction V—V in FIG. 4.

FIG. 1 is three-quarter rear view of a gas turbine engine 1 fitted with its attachment means to the pylon of an aircraft not shown. They may be means for attaching to the wing of an aircraft. According to this mounting mode, the engine comprises an attachment device 40 at the forward end of the engine, attached to the outer fan frame. It also includes attachment means 10 to the aft end, attached to the primary exhaust frame. Thrust transmission is ensured by two links 20 and 22 arranged longitudinally either side of the engine axis and attached at their ends firstly to the base of the fan frame and secondly to the aft mount.

The present invention concerns the aft mount. Mount 10 consists of an upper bracket 12 and three exhaust frame links 16, 17, 18 connecting bracket 12 to the lugs or devises integral with the exhaust frame, not shown. Advantageously these lugs are the constituent parts of a single lower bracket.

A first embodiment of the invention is described below with reference to FIGS. 2 and 3.

The upper bracket consists of a beam 120 here with four housings for passing bolts or screws to join the bracket to the aircraft pylon. Beam 120 is of substantially rectangular shape. It is arranged crosswise relative to the longitudinal axis of the engine. The beam is extended either side in transverse direction by two devises 126, 128 with articulated connection means to exhaust case links 16 and 18 respectively. These two links 16, 18 are arranged trapezoid fashion either side of the vertical plane passing through the engine axis. They ensure the transmission of vertical and tangential loads. A third clevis 127, between the two first, supports the third. link 17 for transmission of engine torque.

Bracket 12 at the forward end, the forward end being defined in relation to the direction of engine thrust, includes an attachment lug 130 to lever 15. Lever 15 is itself connected by its side ends to two thrust links 20 and 22 which extend towards the forward part of the engine.

The lever comprises a central part 150 with two arms parallel to one another 151 and 153. The space between the two arms houses attachment lug 130. A pivot axis passes through the two arms 151, 153 and lug 130 to form first connection means. Pivot axis P1 is therefore oriented in a plane passing through the engine axis. Either side of central part 150 the lever comprises two side attachment lugs 155 and 157 that are planar. Lug 155 comprises second connection means 155–200 with the aft end of thrust link 20. This second connection means consists of a clevis 200 integral with the link and a pivot pin 202 cooperating with a bore 155A machined in the attachment lug. Pivot pin 202 is mounted via a ball joint bushing 202R in bore 155A as can be seen in FIG. 3 showing a cross-section of the attachment lug.

Lug 155 comprises third connection means 155–135, in the alignment of thrust link 20, with bracket 12. This third connection means consists of a clevis 135 integral with the bracket and a pivot pin 136 passing through the two arms of the clevis and a bore 155B. Pin 136 is mounted with clearance E1 in bore 155B.

Similar to lug 155, attachment lug 157 forms second connection means 157–202 with thrust link 22 and third connection means 157–137 with a clevis integral with bracket 12. Pivot pin 22 crosses through the two arms of the clevis integral with the end of thrust link 22 and a bore 157A of lug 157. A ball joint 222R between pivot pin 222 and the bore ensures transmission of loads along the axis of thrust link 22. The third connection means is formed of clevis 137 on the bracket, and of a pivot pin 138 passing through the arms and a bore 157B made in lug 157. Similar to pin 136, pivot pin 138 is mounted with radial clearance E2 in lug 155. Preferably, clearances E1 and E2 are equal.

Advantageously, bores 155A and 155B are aligned with the direction of thrust link 20. The same applies to bores 157A and 157B with thrust link 22.

As can be seen in the figures, the lever has a general boomerang shape.

The functioning will now be described of the connection between the thrust links and the bracket.

When the parts are intact, during normal operation, the stresses applied to the thrust links are transmitted to the lever then via the first connection to the bracket itself integral with the pylon. The connections with ball joint articulation enable filtration of the stresses which are not in the direction of the thrust links. Also the third connections are on standby. This means that these connections do not transmit any load during normal operation. Clearances E1 and E2 are determined so that, irrespective of the aircraft's flight phase, no load is transmitted by these connections.

In the event of failure of a thrust link for example, the lever pivots around the first connection until the clearance of the third connection of the other thrust link is absorbed. Load transmission is then carried out by this third connection.

A second embodiment is now described. Compared with the first embodiment, the corresponding parts carry the same references with prime.

In FIG. 4 as previously a rear mount is shown with bracket 12'. A lever 15' is connected by first connection means 150'–130' to an attachment lug 130' integral with the bracket. The lever in its central part 150' comprises two arms 151' and 153' forming a bi-plane between which the lug is articulated by a pivot axis P1. Either side of this central bi-planar part the lever comprises two lateral devises 155' and 157'. FIG. 5 is a cross-section view along direction V—V of FIG. 4. Clevis 155' is joined by second connection means 155'–200' to an attachment lug 200' integral with the aft end of thrust link 20'. A pivot pin 202 crosses through clevis 155' pierced with bores 155'A and lug 200' pierced with bore 200'A. A ball joint bushing between pivot pin 202 and bore 200'A enables transmission of only those stresses direction along the axis of the thrust link. Clevis 155' includes third connection means 155'–135' with an attachment lug 135' integral with bracket 12. A pivot pin 136' passes through bores 155'B of the clevis and bore 135'B of lug 135'. According to one characteristic of the invention, pin 136' is mounted with clearance E1 in bore 135'.

The functioning of this embodiment is the same as the preceding one. During normal operation the stresses transit via the first connection means and the second connection means. Should a part fail, the corresponding clearance is reduced and the stresses transit via the third connection means.

The invention claimed is:

1. A turbine engine mount to a pylon of an aircraft comprising:
   a bracket arranged to be attached to the pylon,
   a lever attached in its central part to the bracket via first connection means with a pivot pin and two thrust links each joined aft to the lever by second connection means and forwardly comprising means for attachment to the engine,
   wherein said lever includes a central part with two parallel arms, and said bracket includes an integral attachment lug, the attachment lug being placed between said two parallel arms and connected to said parallel arms via said pivot pin to form said first connection means, and said lever is laterally connected to the bracket via pivot pins passing through said lever and mounted with a clearance to form third side connection means on standby.

2. A mount as in claim 1, wherein said lever, on either side of the first connection means, comprises a side lug to support forwardly said second connection means with the thrust link and aft said third connection means on standby with the bracket.

3. A mount as in claim 2, wherein an aft end of each thrust link comprises a clevis cooperating with one of the side lugs via a pivot pin to form the second connection means.

4. A mount as in claim 2, wherein said bracket comprises a lateral clevis cooperating with one of the side lugs of the lever via one of said pivot pins mounted with said clearance to form the third connection means.

5. A mount as in claim 1, wherein said lever, on either side of said first connection means, comprises a lateral clevis to support forwardly said second connection means with the thrust link, and aft said third connection means on standby with the bracket.

6. A mount as in claim 5, wherein an aft end of each thrust link comprises an attachment lug cooperating with one of the lateral clevis of the lever via a pivot pin to form the second connection means.

7. A mount as in claim 5, wherein said bracket comprises a side attachment lug cooperating with one of the lateral clevis of the lever via one of said pivot pins mounted with said clearance to form the third connection means.

8. A turbine engine mount to a pylon of an aircraft comprising:
   a bracket configured to be attached to the pylon;
   a lever coupled to the bracket via a central pivot pin and two thrust links each joined aft to the lever;
   wherein said lever includes a central part with two arms, and said bracket includes an integral attachment lug, the attachment lug being between said two arms and connected to said arms via said central pivot pin, and said lever is connected to the bracket via two lateral pivot pins passing through said lever and mounted with a clearance to provide two standby connections.

9. A mount as in claim 8, wherein said lever, on either side of the central pivot pin, comprises a side lug joined to one of said thrust links and joined to one of said standby connections.

10. A mount as in claim 8, wherein said lever, on either side of said central pivot point, comprises a lateral clevis joined to one of said thrust links and joined to one of said standby connections.

11. A turbine engine mount to a pylon of an aircraft comprising:
   a bracket arranged to be attached to the pylon,
   a lever attached in its central part to the bracket via first connection means with a pivot pin and two thrust links each joined aft to the lever by second connection means and forwardly comprising means for attachment to the engine,
   wherein the first connection means includes two parallel arms spaced apart on the central part of the lever, cooperating with an attachment lug integral with the bracket via the pivot pin, and the lever comprises two third side connection means on standby with the bracket,
   wherein said lever, on either side of said first connection means, comprises a lateral clevis to support forwardly said second connection means with the thrust link, and aft said third connection means on standby with the bracket, and
   wherein an aft end of each thrust link comprises an attachment lug cooperating with one of the lateral clevis of the lever via a pivot pin to form the second connection means.

12. A mount as in claim 11, wherein said bracket comprises a side attachment lug cooperating with one of the lateral clevis of the lever via one of said pivot pins mounted with said clearance to form the third connection means.

13. A mount as in claim 11, wherein said two parallel arms are integral with the lever.

* * * * *